United States Patent [19]

Light

[11] Patent Number: 5,842,217
[45] Date of Patent: Nov. 24, 1998

[54] METHOD FOR RECOGNIZING COMPOUND TERMS IN A DOCUMENT

[75] Inventor: John Light, Hillsboro, Oreg.

[73] Assignee: Intel Corporation, Santa Clara, Calif.

[21] Appl. No.: 773,194

[22] Filed: Dec. 30, 1996

[51] Int. Cl.⁶ .................................................. G06F 17/30
[52] U.S. Cl. ............................... 707/101; 707/5; 707/500
[58] Field of Search ............................... 707/5, 101, 500, 707/530, 531

[56] References Cited

U.S. PATENT DOCUMENTS

| | | | |
|---|---|---|---|
| 5,418,951 | 5/1995 | Damashek | 707/5 |
| 5,442,778 | 8/1995 | Petersen et al. | 707/5 |

OTHER PUBLICATIONS

K.L. Kwok, Experiments with a Component Theory of Probalistic Information Retrieval Based on Single Terms as Document Components, ACM Transactions on Information Systems, vol. 8 No. 4, Oct. 1990, pp. 363–386, Oct. 1990.

Udi Manber & Sun Wu, "GLIMPSE: A Tool to Search Through Entire File Systems," Oct. 1993, pp. 1–10.

Salton, "Automatic Text Processing," Ch. 8–10, 1989, Addison–Wesley, pp. 229–371.

Salton/McGill, "Introduction To Modern Information Retrieval," Ch. 3–6, 1983, Mcgraw–Hill, pp. 53–256.

*Primary Examiner*—Paul Kulik
*Attorney, Agent, or Firm*—Leo V. Novakoski

[57] ABSTRACT

A method is provided for identifying compound terms in a document that is represented by a stream of tokens. The stream of document tokens is scanned for an initial term associated with a compound term and a compound term template is accessed when the initial term is identified. The template includes content, retention, and token specifications for the compound term. The stream of tokens is compared with the template, and when the stream matches the content specification of the template, a token representing the compound term is tagged according to the retention specification and added to the stream of tokens. The tagged token is stopped according to the retention specification represented by its tag.

12 Claims, 5 Drawing Sheets

METHOD FOR RECOGNIZING COMPOUND TERMS IN A DOCUMENT

RELATED PATENT APPLICATIONS

This patent application is related to U.S. Pat. application Ser. No. 08/774,467, entitled, Method For Measuring Thresholded Relevance Of A Document, assigned to the same assignee herein, and filed on even date herewith. This patent application is also related to U.S. Pat. application Ser. No. 08/778,212, entitled, Method For Characterizing A Document Set Using Evaluation Surrogates, assigned to the same assignee herein, and filed on even date herewith.

BACKGROUND OF THE INVENTION

Technical Field

The present invention relates to the field of information retrieval, and in particular to methods for identifying and processing compound terms in document representations.

Background Art

It has long been recognized that searches limited to queries comprising one or more single terms or keywords are of limited value for identifying documents relevant to the query. Single terms may have widely different meanings depending on the context in which they are used. For example, the term "bus" can refer to a means of public transportation or an electrical connection for communicating between electronic devices. Even within the field of electronics, many different types of bus are available, and search queries can be made more precise if the searcher can distinguish between documents that relate to, for example, "processor buses", "expansion buses", and "video buses". For these reasons, information retrieval systems typically include methods for searching documents for combinations of two or more terms having a specified—spatial relationship. These combinations of terms are referred to as compound terms or phrases.

Indexing is the process through which documents are converted into a representation that is convenient for searching purposes. Indexing procedures convert a document into a stream of terms or tokens that represents the words and numbers of the document. This stream of tokens is subject to stopping and stemming processes, through which certain common words are eliminated from the token stream and certain other words are reduced to a common root, respectively. A widely used indexing procedure, referred to as full text indexing, includes data indicating the relative location of each term in the document. This location information is used to identify compound terms following generation of the index.

Full text indexing (FTI) of documents is very costly in terms of both the time required to generate the index and the space required to store it. For example, the index for a document set may be 50–300% as large as the document set itself. The benefit of FTI is that the index structure supports faster searches, and the location information allows a variety of spatial relationships between the component terms of a compound term to be specified in a search query. For example, documents including compound terms can be identified according to whether the terms are adjacent, occur in the same sentence, occur in the same paragraph, or occur within a specified number of words of each other. Where FTI is employed, compound terms are typically identified after the document has been fully indexed, using the location information in the index.

Where the component terms of a compound term are adjacent, as in the case of "processor bus", exact string matching methods, such as those implemented by a UNIX grep command, may be used to identify compound terms. These methods, which are applied before tokenization, do not integrate with later tokenization and do not scale well to simultaneous recognition of large numbers of compound terms in a single stream. For example, a grep command provides a state machine for analyzing text on a character-by-character basis. It is very fast for a single phrase, but a separate grep must be developed for each compound term sought, and searching for multiple compound terms at the same time is slow. The grep command is typically not used as part of indexing Information Retrieval systems for these reasons.

Thus, conventional methods for identifying compound terms require complex and costly indexing schemes (FTI), and are applied only after potentially significant information has been eliminated from the document terms. Other methods, which may be applied with or without FTI, require exact text matches and can be prohibitively slow. In addition, none of the available methods allows a searcher to specify, independently, how a compound term and its component terms are to be treated in subsequent processing steps.

There is thus a need for a method that identifies compound terms prior to the loss of relevant document information, processes the identified compound terms and their component terms independently, and does so without resort to complex indexing schemes.

SUMMARY OF THE INVENTION

The present invention is a method for identifying compound terms and their equivalents as they appear in the original text of a document and specifying treatment of the identified compound terms and their components in a representation of the document. The method scans a tokenized stream of document terms to identify an initial term of a specified compound term and compares the stream, beginning with the initial term, to content indications specified by a data structure that represents the compound term and any equivalents. When the content indications are matched by the stream, a token representing the compound term is tagged according to a status indication specified in the data structure and added to the stream of document terms. The compound term token and its constituent terms may be eliminated or retained in a subsequent stopping step, according to the status indicated by the tag.

BRIEF DESCRIPTION OF THE DRAWINGS

The invention may best be understood with reference to the following detailed description and the accompanying drawings.

DETAILED DISCUSSION OF THE INVENTION

The present invention identifies and processes compound terms as they appear in the original text of a document. It is conveniently implemented as the document is reduced to a compact representation suitable for information retrieval (IR). The resulting compact representation facilitates subsequent browsing/searching by incorporating tokens for selected compound terms relevant to a topic of interest. The compound term tokens incorporate location information in the document representation, without the computation and storage costs associated with full text indexing methods.

In order to incorporate compound terms in a document representation, the present invention requires that compound terms be specified as part of the reduction process. In a preferred embodiment of the present invention, compound terms to be identified in a document are specified in an externally defined list. In one embodiment of the invention, the externally defined list may be specified in a topic profile that incorporates a weighting scheme for relevance analysis. Topic profiles are discussed in greater detail in related patent application, Method For Measuring Thresholded Relevance Of A Document.

One key to the compound term information provided by this indexing scheme is the flexibility of the compound term recognition process. This process allows compound terms and their equivalents to be identified among the original terms of the documents, prior to the loss of any information by stopping or stemming procedures. Equivalent forms of compound terms may be readily identified without specifying the details of each equivalent form. In addition, identified compound terms may be tagged to indicate how they are to be treated in the subsequent indexing steps. Possible treatments include selectively eliminating or retaining either the compound term or its component terms from the document representation. This is especially valuable for eliminating irrelevant documents that would otherwise be identified by aliasing topic terms.

The flexibility of the compound term recognition method of the present invention provides greater control over the type of term information recognized in a document. This in turn enables the generation of a document representation that retains key document information, including term content, punctuation, capitalization, and spatial relationships between terms, in form that is substantially more compact than FTI.

Figure 1:
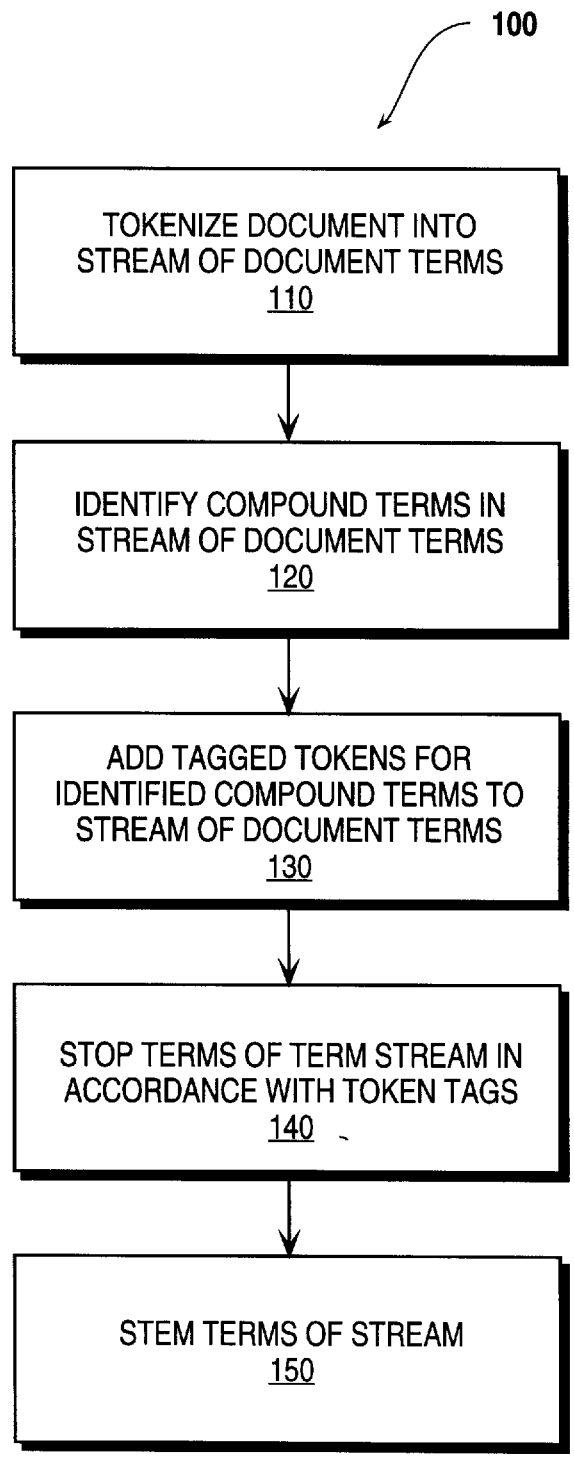
FIG. 1 is a flow chart of a method in accordance with the present invention for providing a compact representation of a document.

Referring first to FIG. 1, there is shown a flowchart of a document indexing process 100, including a compound term recognition steps 120, 130, in accordance with the present invention. According to method 100, a document to be indexed is first tokenized 110 into a stream of document terms. For the purposes of this discussion, a document term is a word, number, symbol, or punctuation mark that appears in the original document. It is noted that conventional indexing schemes typically do not include punctuation marks and other non-alpha-numeric symbols in the tokenization step.

Following tokenization, document terms or tokens representing document terms are scanned 120 to determine whether a compound term or its equivalent is present in the stream of document terms. As discussed below, this is accomplished by identifying an initial term of a compound term in the document term stream and using the initial term to access a data structure representing the compound term. The compound term data structure is a template for the compound term that includes names and tags for each component term of the compound term pointers to subsequent component terms of the compound term., and a canonical name for the compound term. The canonical name provides a common token for a compound term and any equivalent forms of the compound term.

Where more than one form of a compound term may be used to identify the same entity, e.g. savings & loan, Savings and Loan, S & L, a compound term data structure may also include pointers to data structures for these other, equivalent forms of the compound term. In a preferred embodiment, compound terms that identify the same entity, e.g. savings & loan and thrift, are represented by the same canonical name. This recognizes the equivalence of the terms and allows different references to the same entity to be identified without over-weighting the multiple references.

For each compound term template matched by the document term stream, a tagged token representing the compound term (and its equivalent forms), its retention/elimination status, and the retention/elimination status of it component terms is added 130 to the stream. The elimination/retention status of a token determines whether the token is retained in the document representation. The document term stream, augmented by the tagged token, is subjected to a stopping step 140, whereby common terms are eliminated and compound terms and their components are retained or eliminated according to the status indicated by the tagged token.

Following stopping, non-compound terms remaining in the stream are stemmed 150 to provide a compact index of terms suitable for relevance analysis. Relevance analysis may be done using a topic profile as described in the related application, Method For Measuring Thresholded Relevance Of A Document.

Figure 2:
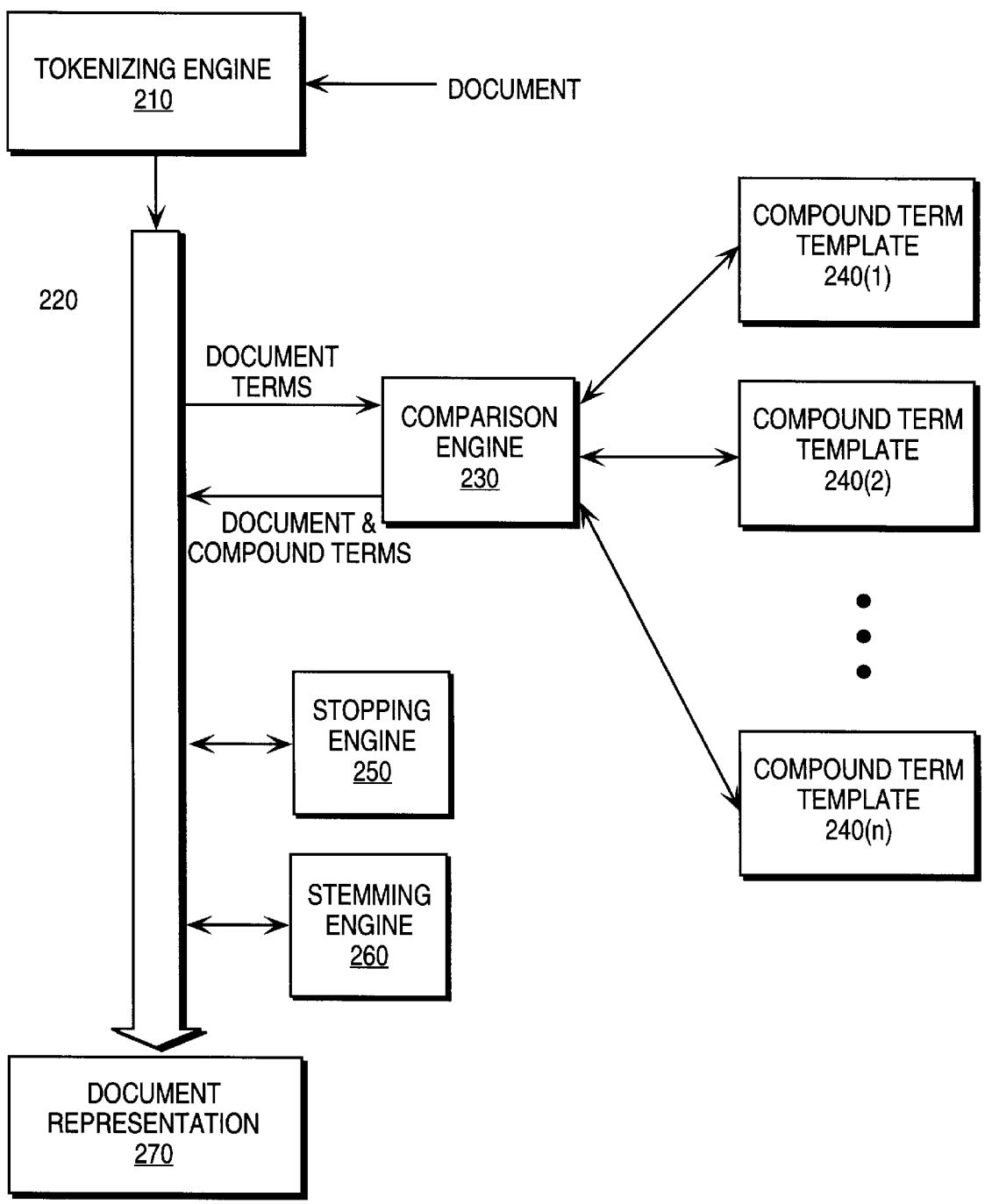
FIG. 2 is a block level diagram of a system in accordance with the present invention for implementing the compact representation method of FIG. 1.

Referring now to FIG. 2, there is shown a block level diagram of a system 200 for implementing method 100 in accordance with the present invention. System 200 comprises a tokenizing engine 210, a comparison engine 230 and one or more compound term templates 249(1), 240(2), 240(n). Also shown for completeness is a stopping engine 250 and a stemming engine 260. In the following discussion, a general index j refers to a representative template (240(j)) of the collection of compound term templates 240(1), 240(2) . . . 240(n), and the collection of templates is identified without an index (240).

Tokenizing engine 210 converts the terms of a document into a stream 220 of document terms or tokens, which is acted upon by comparison engine 230, stopping engine 250, and stemming engine 260. Comparison engine 230 scans the document terms in stream 220 and a accesses compound term template 240(j) when an initial compound term of template 240(j) is identified in stream 230. In one embodiment, compound term templates 240 are represented by hash tables and comparison is effected by hashing terms in the document stream and comparing the terms with the label at the associated hash table entry.

If a comparison between stream 230 and template 240(j) indicates that a match exists, template 240(1) provides comparison engine 230 with a compound term token that has been tagged to indicate the retention/elimination status of the compound term and its component terms. The tagged token is added to stream 220, where it is acted upon by stopping engine 250 according to the status tag. Tokens that are not eliminated by stopping engine 250 are processed by stemming engine 260, where appropriate, and added to document representation 270. Representation 270 retains sufficient detail about the terms of the document to allow meaningful relevance analysis.

Figure 3:
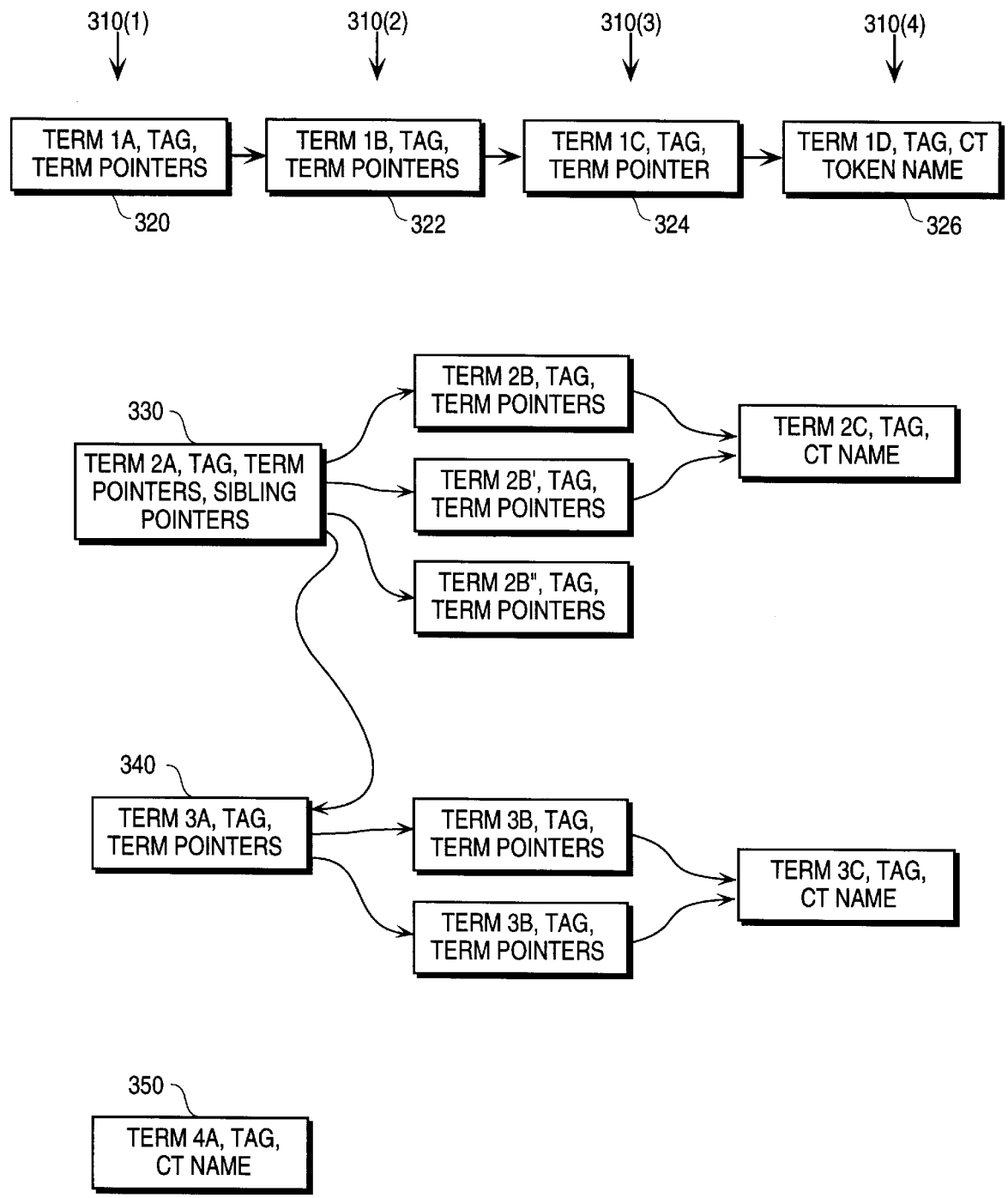
FIG. 3 is a schematic representation of one implementation of the data structures used to identify compound terms in the method of FIG. 1.

Referring now to FIG. 3, there is shown one embodiment of compound term templates 240(1), 240(2), 240(3), 240(4) for implementing compound term recognition method in accordance with the present invention. In the embodiment of FIG. 3A, compound term templates 240 are implemented by a series of hash tables 310(1), 310(2), 310(3) . . . 310(p). All entries in hash table 310(1) correspond to initial terms of one of the compound terms represented by compound term templates 240. Similarly, all entries of hash table 310(2) correspond to second component terms of one of the compound terms represented by templates 240.

Referring first to entry 320, term 1A is a label, e.g. character string, corresponding to the initial term of a compound term represented by compound term template 240(1). A tag in entry 320 specifies how term 1A is to be treated in a subsequent stopping step 140 (FIG. 1), and a pointer indicates the location in hash table 310(2) of the entry (1B) that follows term 1A in the compound term. Entries 322, 324 for terms 1B and 1C include similar information. Entry 326, which corresponds to the last component term in compound term template 240(1) includes a label for the term, a tag, and a label indicating the canonical name of the compound term, i.e. the token name.

Intermediate terms may also include a canonical name for the compound term, where a subset of the component terms may indicate the same compound term as the fall set of component terms. For example, consider the case where compound term template 240(1) is designed to pick out references to the "Federal Bureau of Investigation" in a document. In this example, terms 1A, 1B, 1C, and 1D correspond to "Federal", "Bureau", "of", and "Investigation", respectively. A document might initially use the full name of the organization and subsequently identify it as the "Federal Bureau". For these latter instances of the term, template 240(1) should be able to terminate at term 1B and generate the same canonical compound term name as when the stream of document terms includes the fall title. In general, any term of a compound term template 240(j) which may terminate an alternative representation of the compound term should include the canonical compound term name in addition to a pointer to the subsequent terms of the full compound term name. Where the subsequent term of the stream of document terms fails to match the label of the subsequent entry, the shortened form of the compound term can still be identified using the shortened form.

The comparison between the term stream and template continues as long as document terms in the stream match the corresponding labels in an accessed compound term template. The comparison ceases when a document term from the stream fails to match the next term in the compound term template or a last term in the template is reached. In the first case, the template is closed, and in the second case, a compound term token is added to the document stream with a tag specified by the corresponding template. Entries 330 and 340 represent the initial terms for a compound term template 240(2) that includes an alternative form (template 240(3)) of the compound term. In this case, entry 330 includes pointers to more than one second term (terms 2B and 2B') in the compound term, as well as a pointer to a sibling first term (term 3A) having its own second terms 3B, 3B' and third term 3C. One use for such coupled templates arises where different capitalizations of a compound term are considered acceptable for identification purposes. For example, the compound terms, "savings and loan", "Savings and Loan", Savings And Loan", "Savings & Loan", and "savings & loan" may be used in different documents relating to the banking industry. In order to identify a document using any of these references, methods that rely on exact string matching must identify each reference separately in a query. As noted above, FTI methods typically ignore capitalization altogether, losing potentially valuable information and eliminating any ability to discriminate between different capitalizations of compound terms.

Alternative forms of compound terms are handled efficiently by compound term templates 240 of the present invention. For example, by assigning labels to the component terms of templates 240(2), 240(3) as indicated in Table 1 and coupling them as indicated by the arrows in FIG. 3A, the following variations on Savings and Loan will be identified in a document set: "Savings and Loan; Savings And Loan; Savings & Loan, Savings and loan; Savings & loan; savings and loan; and savings & loan. As noted above, where alternative forms are used for a compound term, the canonical name of the compound term token is preferably the same for each form. Thus, CT NAME is the same for both terms 2C and 3C.

TABLE 1

| ENTRY | TERM |
| --- | --- |
| 2A | Savings |
| 2B | And |
| 2B' | & |
| 2B" | and |
| 2C | Loan |
| 3A | savings |
| 3B | & |
| 3B' | and |
| 3C | loan |

The efficiency of the compound term templates of the present invention is most apparent where multiple document sets will be subjected to the same analysis, since the same list of compound terms may be applied to each set of documents in which the topic characterized by the compound terms is sought. Unlike the keyword-based queries employed in standard browsing/searching systems, which are generated and discarded as needed, compound term lists are intended to be retained for multiple applications and their contents refined to enhance the correlation between the included compound terms and the topic they are being used to characterize. The efficiency of compound term identification may be further enhanced by providing methods for automatically generating the compound term templates. For example, algorithms may be developed for generating from user provided inputs data structures having selectively coupled components such as those of FIG. 3.

Entry 350 is the initial term of a compound term template 240(4) representing a compound term that has only a single component term. Consequently, entry 350 includes a label (term 4A), a tag, and a canonical name, but does not include pointers to other terms. Such compound term templates are useful for specifying a term for which a specific capitalization is sought. For example, a search term "thrift" may pick up documents relating to a wide variety of topics. By specifying it as a compound term and including a template for only the capitalized form of the word, searchers can identify those documents that use the term to refer to financial institutions more efficiently. Another single component compound term useful in the same search is "thrifts", where compounding is used to retain the plural form in the document representation. A two component compound term, "the thrift", would also be useful for these purposes. Because, for example, "thrift" and "S&L" are used interchangeably to describe certain financial institutions, they are identified by the same canonical name.

Figure 4:
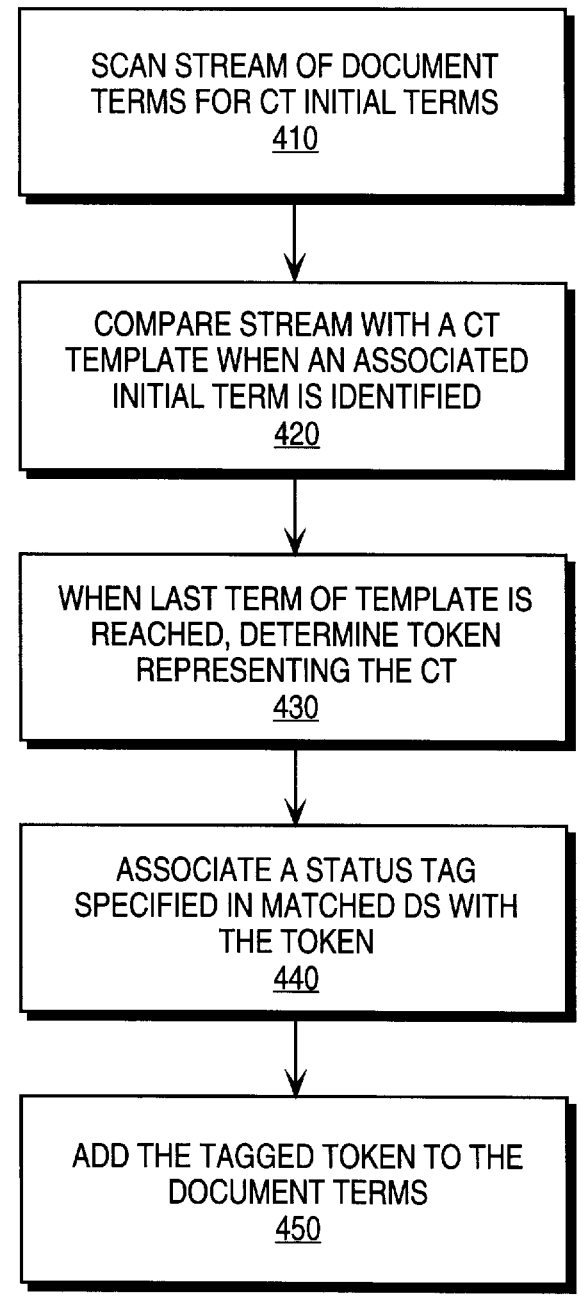
FIG. 4 is a flowchart of a method for identifying compound terms in accordance with the present invention.

Referring now to FIG. 4, there is shown an overview 400 of the compound term recognition method implemented using compound term templates 240 and comparison engine 230. Initially, the stream of document terms is scanned 410 for the initial terms of any compound terms (CT) to be identified. When an initial term is identified, it is used as an index to access a corresponding compound term template. For example, where the templates are implemented by hash tables, an initial term serves as a key to a location in the hash table. The location includes information on the first term and points to subsequent term(s) of the corresponding compound term.

Once the compound term template is accessed, subsequent terms in the stream are compared 420 against those specified in the template, and tags assigned to the template terms are tracked. A match is indicated when terms in the stream match those specified in the template, up to and including the last term of the compound term. The last term specifies 430 a canonical name for a token representing the compound term, and the token is associated 440 with a status tag that is derived from tags for component terms of the compound term. The tagged token is added 450 to the stream with the document tokens that for the component terms, for further processing. The status tag of each identified compound term is used in a subsequent processing step, i.e. stopping step 140 (FIG. 1), to determine which of the compound and component term tokens will be retained in the document representation.

Where a compound term comprises a single term entry, i.e. the initial term, the comparison consists of matching the label of the initial term entry to the initial term used to access the compound term template. Where alternative form templates are associated with an initial term, the alternative form templates are accessed along with the compound term template, and comparison of stream terms with the component terms of the templates proceed in parallel.

Figure 5:
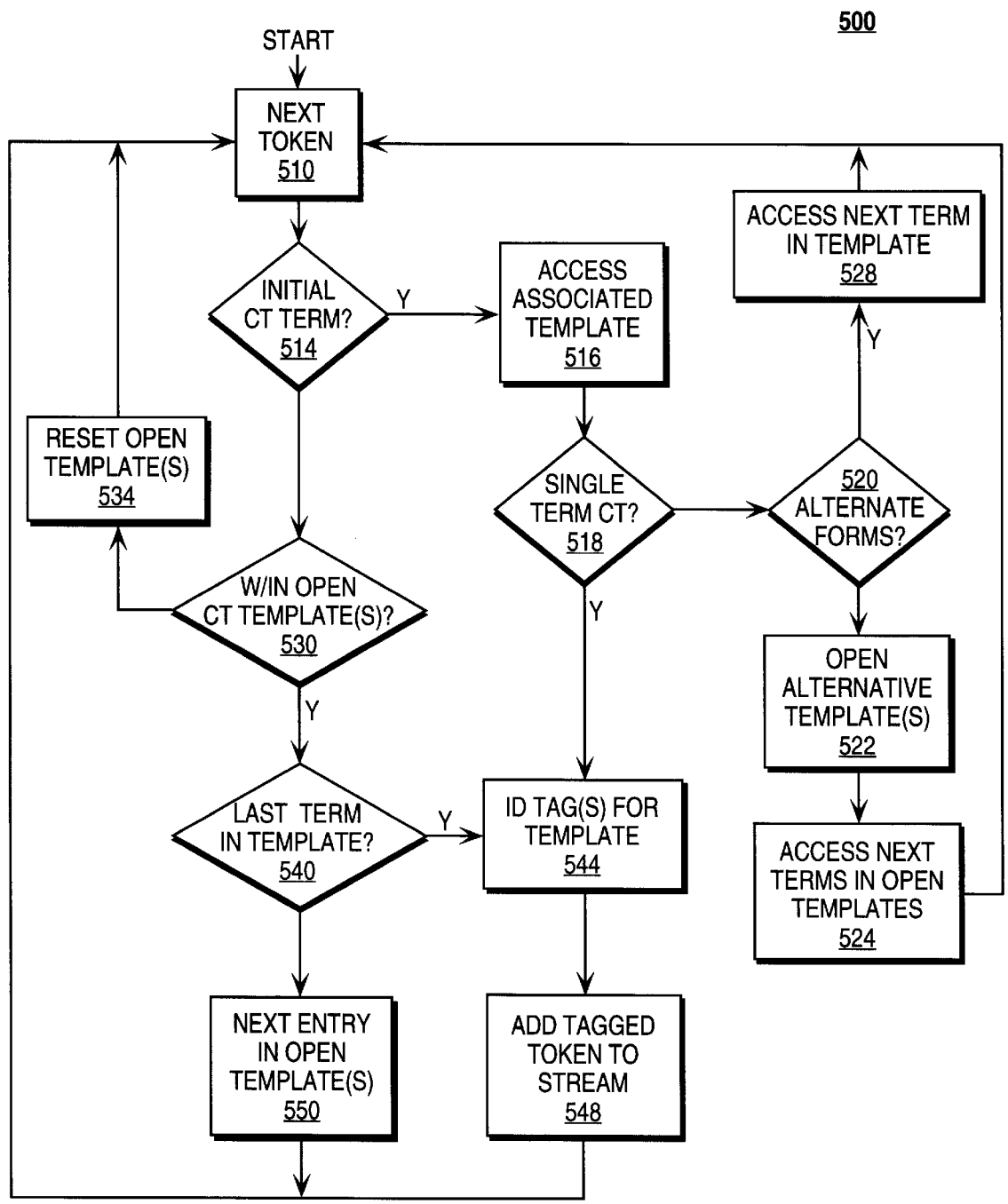
FIG. 5 is a more detailed flow chart of the method represented by FIG. 4.

Referring now to FIG. 5, there is shown a detailed flow chart 500 of an embodiment of method 400 for compound term recognition. Each term (token) from the stream of document terms is scanned 510, and it is determined 514 whether the term is an initial term of one or more compound terms. If the term matches an initial term, a corresponding compound term template is accessed 516 and the first entry examined. If the first entry indicates 518 that the compound term comprises a single term, a tag specified in the initial entry is identified 544 and associated with a token for the compound term. The tagged compound term token is added 548 to the stream of document terms.

For those templates determined 518 to include multiple component terms, the availability of alternative form templates is checked 520. If there are no alternative form templates, the next entry in the compound term is accessed 528 for comparison with the next token 510. If alternative form templates are indicated by the first entry, the alternative form template is accessed 522 and the next entries in the original and alternative compound terms are accessed 524 for comparison with the next token 510.

The next token 510 is scanned for comparison with initial terms. If it is an initial term, steps 516, et seq. are repeated. If the next token is not an initial term, it is compared 530 with the next entries in any currently accessed template(s). If the token does not match the next entry of one of the accessed templates, these templates are reset 534, i.e. closed, and the next token is examined 510. If the term does match a next entry in an accessed template, the entry is checked 540 to determine whether it is the last of the compound term or another term remains. In the second case, the next term is identified 550 for comparison with the next token 510. In the first case, a tag for the compound term (CT) token is determined 544 for from the template entries and the tagged CT token is added 548 to the stream of document terms. Method 500 is repeated until all document terms in the stream have been analyzed.

Following processing by method 500, the stream of document terms is augmented by tokens representing various compound terms identified among the document terms. Tags associated with each of the compound term tokens will indicate to stopping engine 250 (FIG. 2) how to treat the component terms of the compound term. For example, a status tag associated with a compound term may indicate that only the compound term token should be retained in the document representation. In this case, tokens corresponding to the component terms of the compound term will be stopped, i.e. eliminated from the stream. The ability to selectively eliminate compound and component terms at this stage of the indexing process is particularly useful where component terms may alias different topics when their tokens are retained, unmodified, in the document representation.

Aliasing occurs where a term that is correlated with one topic, is also correlated with other topics when used in different contexts. For example, the term "French" is not a common term, and it has a strong, positive correlation with the topic of French culture. However, this term may also appear in documents relating to music (French horn), breakfast foods (French toast), and fast foods (French fries). Aliasing refers to situations in which a term such as "French" that is strongly correlated with a specified topic may also appear in a different context with a meaning different from that in the specified topic. Alias terms are those terms having the context-dependent meaning.

The tagging feature of the present invention provides a flexible method for dealing with aliasing. In the above example, the terms "French fries", "French horn", and "French toast" may be included in the list of compound terms developed to identify documents that relate to French culture. The data structures (templates) representing these compound terms will include a tag indicating that no separate token for "French" is to be retained in the document representation for any instance of "French" appearing in one of these compound terms. Where a compound term is tagged so that various of its component terms are eliminated from the stream of document terms, the compound term is referred to as "exclusive".

In the above example, a document search for terms may first be processed by reference to the exclusive compound terms "French toast", "French fries", and "French horn". The exclusive compound terms will eliminate from the document representation any instances of the term "French" that appear as a component of one of these compound terms. A subsequent search of the document representation, using the single term "French" as a keyword, will only identify instances of "French" that do not appear in the document in these aliasing compound terms.

Other compound terms may require that component terms be retained in the document representation so they are available as independent search terms. For example, a compound term, "Federal Bureau of Investigation" may be specified to identify documents relating to the FBI. In this case, the component terms may be tagged so they are retained in the representation generated from the stream of document terms. This tagging would allow references to the "Federal Bureau" or the "Bureau" to be identified in a document. In addition, use of the same canonical token to represent these different compound terms allows multiple references to the same entity to be readily identified.

There has thus been provided a method for identifying compound terms in a document and processing the compound terms and their components in flexible manner. The compound term identification occurs early in the indexing process, before term information is lost through either stopping or stemming. Compound terms are defined through data structures that allow alternative forms of the compound term to be specified along with processing instructions for component terms of the compound term.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

I claim:

1. A method for identifying a compound term in a document that is represented as a stream of document terms, the method comprising the steps of:

scanning the stream of document terms for an initial term associated with the compound term;

when the initial term is identified, accessing a compound term template that includes content, retention, and token specifications for the compound term;

comparing the stream, beginning with the initial term, to the compound term template; and adding to the document stream a tagged token indicated by the token and retention specifications of the template, when the stream matches the content specification of the template.

2. The method of claim 1, wherein the accessing step comprises the substeps of:

converting the initial term into a location key; and accessing a compound term template having an entry point specified by the location key.

3. The method of claim 1, wherein the comparing step comprises the substeps of:

identifying the content specification of the template; and comparing the stream with the content specification.

4. The method of claim 3, wherein the identifying step comprises determining component terms, including a last term, of the compound term from the content specification and wherein the comparing step comprises comparing the document terms of the stream with the component terms until the last term is identified.

5. The method of claim 1, wherein the step of accessing a compound term template comprises the substeps of;

accessing a compound term template;

determining from the content specification whether there is an alternative form template; and accessing the alternative form template, including content, retention, and token specifications, when indicated by the content specification of the compound term template.

6. The method of claim 5, wherein the comparing step comprises comparing the stream, beginning at the initial term, with the content specifications of the compound and alternative form templates.

7. A method for identifying a compound term in a document, using a data structure that represents the compound term, the method comprising the steps of:

converting the document into a stream of document terms;

scanning the stream of document terms for an initial term associated with the compound term;

when the initial term is identified, comparing the stream, beginning with the initial term, to content indications specified by the data structure; and when the content indications are matched by the stream, tagging a compound term token in accordance with status indications specified in the data structure and adding the tagged compound term token to the stream.

8. The method of claim 7, wherein the comparing step comprises the substeps of:

determining from the data structure, whether the compound term includes alternative forms; and when the data structure indicates that alternative forms exist, determining alternative content indications in addition to those specified by the data structure and comparing the stream, beginning with the initial term to the content indications and the alternative content indications.

9. The method of claim 7, including the additional step of stopping the compound term token in accordance with the tag.

10. The method of claim 9, wherein the stopping step comprises the substeps of eliminating component terms from the stream and retaining the compound term token when the tag has a first value; and retaining the component terms and the compound term token in the stream when the tag has a second value.

11. A system for identifying compound terms in a document that is represented as a stream of document terms, the system comprising:

a comparison engine coupled to receive the stream of document terms, for comparing the received document terms to a data structure representing the compound term; and a data structure representing the compound term and coupled to the comparison engine through a location derived from the initial term, the data structure including a content specification for indicating a component term of the compound term, a retention tag associated with the content specification for indicating a status of the component term in an index representation of the document; and a token specification, associated with the content specification for identifying a token to be added to the document stream the content specification is met.

12. A method for identifying a compound term in a document, using a data structure that represents the compound term, the method comprising the steps of:

tokenizing the document into a stream of document terms;

detecting an initial term of the compound term in the stream of document terms;

identifying content and retention specifications for the compound term from the data structure;

adding a token representing the compound term to the stream when the specified content indication is matched by the stream; and tagging the token according to the retention specification indicated in the data structure.

* * * * *